UNITED STATES PATENT OFFICE.

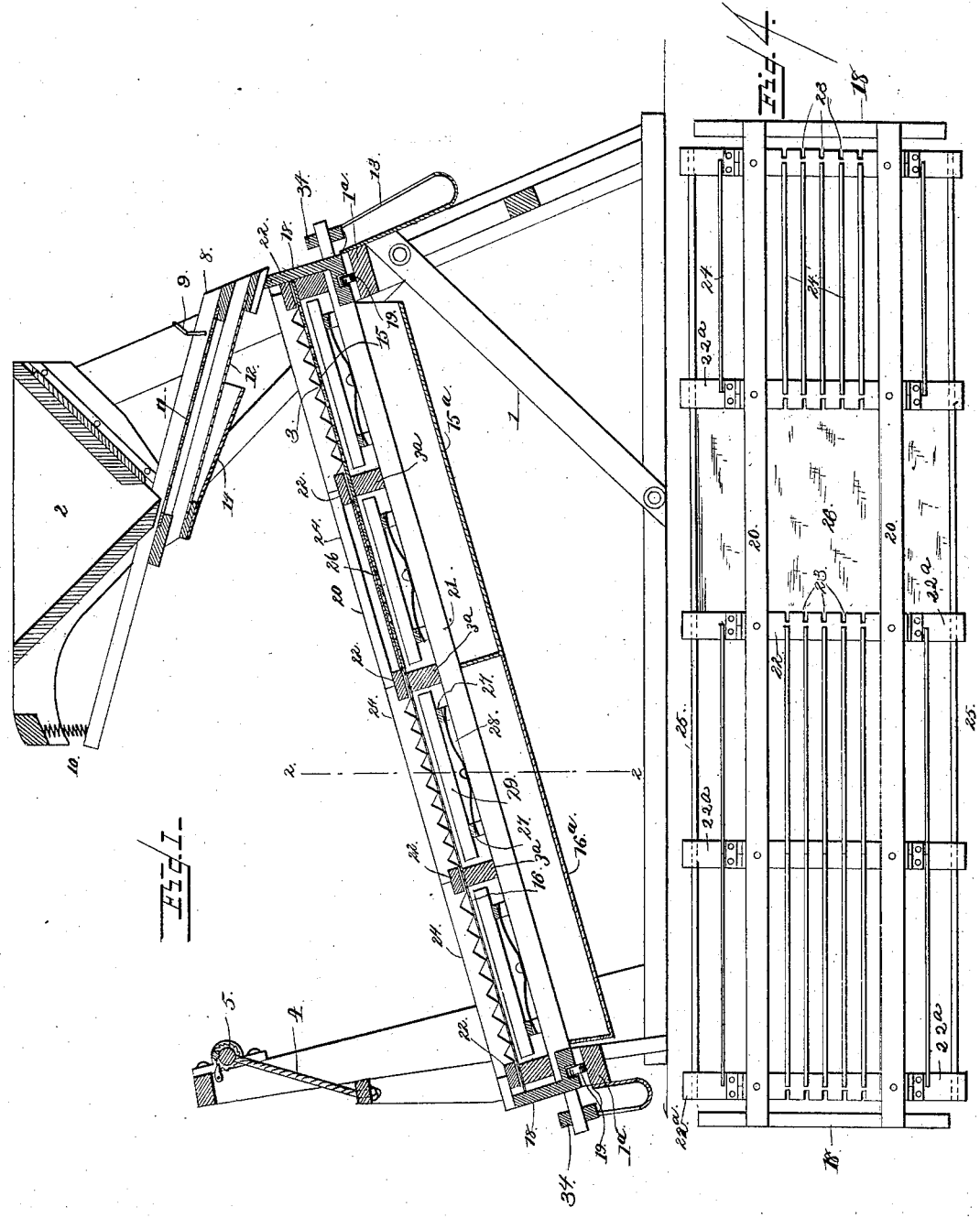

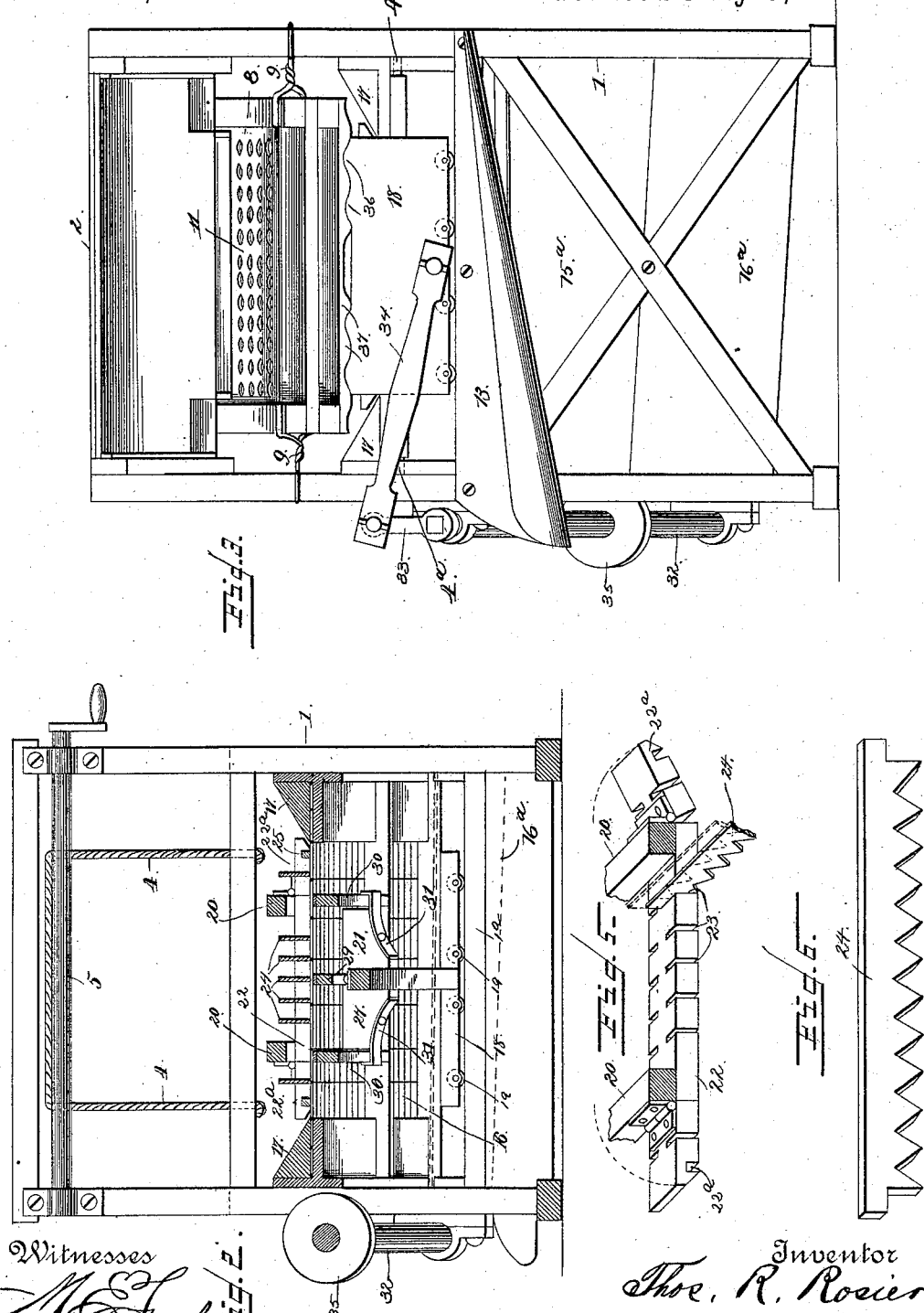

THOMAS R. ROSIER, OF SIOUX FALLS, DAKOTA TERRITORY.

FLAXSEED AND GRAIN SEPARATOR.

SPECIFICATION forming part of Letters Patent No. 365,863, dated July 5, 1887.

Application filed September 1, 1886. Serial No. 212,395. (No model.)

*To all whom it may concern:*

Be it known that I, THOMAS R. ROSIER, a citizen of the United States, residing at Sioux Falls, in the county of Minnehaha and Territory of Dakota, have invented a new and useful Improvement in Flaxseed and Grain Separators, of which the following is a specification.

This invention consists in certain features of novelty, which are hereinafter particularly pointed out in the claims, being first fully described with reference to the accompanying drawings, in which—

Figure 1 is a vertical longitudinal section of the improved separator. Fig. 2 is a vertical transverse section thereof on the line 2 2 of Fig. 1. Fig. 3 is an elevation of the hopper end of the machine. Fig. 4 is a plan view of the rubbing and agitating mechanism removed from the machine. Figs. 5 and 6 are detail views of parts hereinafter more particularly described.

1 represents the skeleton frame of the machine, 2 the hopper, and 3 the principal screen. The shoe of the screen 3 is pivoted at the head by suitable pivot-bolts or trunnions, 4ª, which are fitted in the fixed frame of the machine, as shown in Fig. 3, and supported at the tail end by cords, ropes, or chains 4, which are attached to and adapted to be wound upon a winch, 5, suitably journaled in boxes fixed to the frame 1, a detent being provided for holding the winch from retrograde movement after the tail end of the shoe is elevated to the desired height. As the grain leaves the hopper 2, and before it reaches the principal screen 3, it is subjected to the action of a gang of screens supported beneath the hopper and inclined toward the head of the principal screen. The lower end of the shoe 8 of these screens is connected to and supported from the frame 1 by means of links or hangers 9, while the upper end is supported by means of coiled springs 10, which afford great freedom of movement. The upper one, 11, of this gang of screens is preferably formed of perforated sheet metal, and is designed to separate only very large foreign substances from the grain, delivering them onto the floor or into a receptacle placed thereon at the head of the machine. The next one, 12, is of coarse wire gauze or netting, the substances which are too large to pass therethrough being discharged into a spout, 13, fixed to the end of the machine and inclined toward one side. Beneath this under screen, 12, is a cant-board, 14, which catches the material which passes therethrough and delivers it onto the head of the principal screen 3.

In a full-sized working-machine constructed by me for separating flaxseed from other grain and refuse matter, I make this principal screen of sections of the following pattern, the openings of which increase in size from the head toward the tail of the screen, to wit: The upper section of the screen is made of zinc, in which are formed round or circular openings of about one-fourteenth of an inch in diameter, and the lower section at the foot of the screen is likewise made of zinc, with a large number of longitudinal slots, the dimensions of which are three inches long and one-eighth of an inch wide. The flaxseed, grain, &c., after having been partially cleansed of sticks and other refuse matter, is deposited on the principal screen at the head thereof, where the mustard-seed, grass-seed, dust, dirt, and other fine matter will pass through the circular holes or openings in the upper section, while the flaxseed, owing to its peculiar elongated form, cannot pass through said circular openings, but will slide over the upper screen-sections onto the lower sections, and pass through the slots therein, and the wild buckwheat, cockle, and other coarse refuse pass over the tail end of the screen, as will be readily understood by persons skilled in the art to which my invention relates.

It will be understood that a screen of the foregoing description is adapted for use in separating flaxseed only, and that screens of different patterns can be substituted therefor when it is desired to separate other kinds of grain or seeds.

Separate boards, 15ª and 16ª, are placed beneath the primary screen, and they are inclined toward one side of the machine to catch and deliver the seeds and grain into suitable receptacles.

Screens having sections differing in size of mesh with separate cant-boards for catching the grain passing through the respective sections are of course old, and I do not claim such as my invention.

The edges of the screens are secured to the shoe and covered by removable cleats 17, the upper surfaces of which incline toward the center of the screen, for the purpose hereinafter set forth. The screens may be readily removed, when it is desired to replace them by new ones or others of different-sized mesh for treating different sizes of seed or grain, by first removing these cleats.

During the operation of the machine the shoe remains stationary, the under side of the screen being traversed by rubbers and the upper side by agitators, as now to be described, these latter parts being represented as removed in Fig. 4.

18 represents a pair of "head-blocks," which rest upon cross-pieces 1ª of the frame at the respective ends of the machine through the medium of anti-friction rollers 19. These head-blocks are connected by (preferably) three strips—two, 20, which pass above, and one, 21, which passes beneath the screen. Attached to the upper strips, 20, are the agitators, and to the lower strip, 21, the rubbers. Secured to the strips 20 are any desired number of cross-pieces, 22, which are provided on both sides with vertical notches 23, as represented in Figs. 4 and 5. Fig. 6 represents a toothed slat, 24, whose ends fit loosely within opposing notches 23 of two adjacent cross-pieces, 22. In practice these slats are about two (2) inches wide and three-sixteenths ($\frac{3}{16}$) of an inch thick, the cross-pieces 22 being about two (2) feet and the notches 23 two (2) inches apart. These cross-bars 22 are carried by the longitudinal bars 20 in their transverse movements with the head-blocks 18, and these bars 22 are arranged a short distance above the screen, so as to be out of contact therewith on their lower sides, and thereby leave intermediate spaces between the bars 22 and the screen, to permit the flaxseed, grain, &c., to pass beneath the bars 22 without hinderance from the latter. The notches 23 are of such width that the slats 24 are free to move vertically therein, the latter being formed at their ends with offsets or shoulders, which are adapted to bear or impinge upon the upper sides of the transverse bars to prevent them from falling out of place in case the frame of the agitator (i. e., the strips 20 and cross-pieces 22) is lifted up from the screen. Each of the cross-pieces 22 is formed in three parts hinged together, for a purpose hereinafter referred to, the end sections, 22ª, being braced and connected so as to move in unison by means of strips 25, extending the entire length of the agitator. The outer extremities of the sections 22ª are beveled off on their under sides, so as to bear against and ride up the inclined upper surfaces of the cleats 17 each time the agitator is reciprocated, so that the toothed slats carried by the hinged sections will serve to efficiently scrape any seed or chaff, &c., that may adhere to the beveled sides onto the primary screen in their retrograde movement.

In separating cockle from wheat a suitable screen is placed in the frame of the principal screen 3, and a piece of heavy canvas or cloth, 26, is stretched tightly across one section of the screen and secured to the longitudinal bars 20 and between two adjoining transverse bars, 22, the intermediate notched bars being removed. This heavy piece of canvas or cloth is disposed in close proximity to the screen, and it prevents the wheat and cockle from running rapidly over the screen and facilitates the escape of the cockle therethrough.

The rubbers for traversing the under side of the screen and keeping its meshes free and unobstructed are equal in number to the number of parts into which the screen is divided by the transverse braces 3ª of the shoe. Each consists of cross-heads 27, notched on the under side for straddling the supporting-strip 21, upon which they rest, through the medium of a spring 28, and they are connected by a central strip, 29, whose upper side is in contact with the under side of the screen. In addition to the strip 29, there are any desired number of strips 30, which are also pressed into contact with the under side of the screen by springs 31, whereby each strip 30 is separately attached to the cross-head 27. These strips are preferably provided on their upper edges with some soft material, which prevents injury to the screen. By supporting and holding each strip to its work by a separate spring it will be observed that its proper operation will not be interfered with by the canting of the cross-heads which carry them, or by other irregularities in the operation of the machine.

The head-blocks 18 are reciprocated in unison transversely of the machine by means of a rotary shaft, 32, journaled in boxes supported by the frame 1, and having at each end a crank, 33, with which the respective head-blocks are connected by pitmen 34. This shaft is provided with a pulley, 35, for the reception of a belt, whereby it may be rotated. The head-block at the head of the machine is provided on its upper side with a series of teeth or cams, 36, with which engage a corresponding series of teeth or cams, 37, at the lower end of the shoe 8, whereby the latter is shaken or jarred by the reciprocation of the shoe.

This being the construction of my improved machine, the operation thereof is as follows: The seed or substance to be separated is placed in the hopper 2, and power is applied to the rotary driving-shaft 32, the pitmen 34 of which cause the head-blocks 18 to travel back and forth on their rollers, which bear upon the main frame of the machine, the primary screen 3 remaining fixed or stationary. As the lower end of the gang of suspended screens is connected to the upper reciprocating head-block, they are caused to swing back and forth therewith and thus agitate and shake the grain or seed falling thereon from the hopper upon the primary screen. As the longitudinal bars 20 and 21 are carried by the head-blocks in their reciprocating motions, the fixed cross-bars 22 on the longitudinal bars 20 are likewise actuated, and thus carry the toothed bars 24 across the screen 3, to keep the latter clear, and constantly agitate the grain thereon, the said bars 24 being capable of vertical play or movement independent of the cross-bars, and the hinged end sections, 22ª, on opposite sides of the latter, alternately ride up the inclined sides of the cleats 17, to cause the toothed bars thereon to scrape any matter that may adhere to the sides back upon the screens. The strips on the lower or under sides of the primary screen partake of the reciprocating motion of the longitudinal bar 21, and the cross-heads 27 of each of these strips are affixed to the terminal ends of a carrying-spring, which is affixed at its middle to the bar 21, the supplemental bars 30 being each carried by an independent spring, 31, and pressed into contact thereby with the lower side of the primary screen, so that the bars are held against the screen independently of any canting motion of the other parts.

What I claim as new is—

1. In a separator, the combination of a stationary primary screen, a hopper, a shoe loosely suspended by springs and links intermediately of the hopper and primary screen and having the teeth or cams on its lower side, the reciprocating head-blocks traveling on suitable rollers, one of said blocks having teeth or cams which engage the corresponding teeth on the shoe to agitate the latter, the longitudinal bars connecting the head-blocks, and the toothed bars working over the screen and carried by the longitudinal bars, as and for the purpose described.

2. In a grain-separator, the combination of an inclined shoe having the teeth or cams on its lower end, the links pivoted thereto, the coiled suspensory springs connected to the head of the shoe, and a reciprocating head-block arranged beneath the shoe and having the fixed teeth or cams engaging with those of the shoe, as set forth.

3. The combination, in a separator, of a primary screen, the reciprocating head-blocks, one of them having cams and both carrying the agitator-bars operating over the screen, a hopper, and a shoe inclined toward the head of the primary screen and having cams which engage with the cams on one of the head-blocks, as and for the purpose described.

4. In a separator, the combination, with a suitable frame and fixed primary screen, of the reciprocating head-blocks arranged at the ends of the screen, supporting-rollers on which the head-blocks travel, the longitudinal bars affixed to the head-blocks and arranged above the screen, and the transverse bars carrying the slats, as and for the purpose described.

5. In a separator, the combination, with a suitable frame and a fixed primary screen, of a pair of reciprocating head-blocks, the longitudinal bars affixed thereto and arranged above the screen, the transverse bars affixed to the longitudinal bars, and the toothed bars carried by the transverse bars and free to move vertically therein, as and for the purpose described.

6. In a separator, the combination of the primary screen having the cleats provided with the inclined upper sides, the reciprocating head-blocks, and the agitator-bars carried by the head-blocks and having the swinging end sections free to ride upon the inclined sides of the cleats, as and for the purpose described.

7. In a separator, the combination, with the screen having the cleats provided with the inclined sides, of the reciprocating agitator having the transverse bars provided with the swinging end sections adapted to ride up the inclined cleats, and the toothed bars carried by the transverse bars and the end sections thereof, as and for the purpose described.

8. The combination, with the screen, of the agitator, consisting of the frames 20 and 21, cross-pieces 22, having notches 23, and the toothed slots 24, resting loosely in said notches so as to move freely in vertical planes, substantially as set forth.

9. The combination, with a screen having cleats having inclined sides, of a reciprocating agitator having hinged outside sections, substantially as set forth.

10. The combination, with the screen 3, of the reciprocating head-blocks 18, the strips 20, connecting said head-blocks, the cross-strips 22, having the notches 23, and the toothed slats 24, having the shouldered ends fitting loosely in said notches, substantially as set forth.

11. The combination, with the screen 3, having cleats 17, having inclined sides, of the reciprocating head-blocks 18, the strips 20, connecting them, the cross-pieces 22, formed in sections hinged together, and provided with notches 23, the slats 24 and the strips 25, connecting the outside hinged sections, 22ª, of the strips 22, substantially as set forth.

12. In a separator, the combination, with a primary screen, of the reciprocating head-blocks, a longitudinal bar connecting the head-blocks, the elastically-supported rubber bars carried by the longitudinal bar, and an independent spring for pressing each rubber bar into contact with the screen, as and for the purpose described.

13. In a separator, the combination, with a screen, of the reciprocating head-blocks, a longitudinal bar connecting the head-blocks and movable therewith, the cross-heads carried by the longitudinal bar, the springs affixed to the cross heads, and the rubber bars carried by the springs and pressed thereby into contact with the screen, as and for the purpose described.

14. The combination, with the screen, of the supporting-strip 21, the notched cross-heads